(12) United States Patent
Meyer et al.

(10) Patent No.: US 8,392,103 B2
(45) Date of Patent: Mar. 5, 2013

(54) DATABASE FOR EFFICIENT STORAGE OF TRACK GEOMETRY AND FEATURE LOCATIONS

(75) Inventors: Thomas J. Meyer, Marilla, NY (US); Charles W. Morris, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 645 days.

(21) Appl. No.: 12/402,706

(22) Filed: Mar. 12, 2009

(65) Prior Publication Data

US 2010/0235020 A1 Sep. 16, 2010

(51) Int. Cl.
G05D 1/02 (2006.01)
G08G 1/16 (2006.01)

(52) U.S. Cl. ........................ 701/300; 340/903
(58) Field of Classification Search .................. 700/189, 700/159, 182; 703/2; 378/4, 901; 342/357.57; 348/157; 701/300
See application file for complete search history.

(56) References Cited

U.S. PATENT DOCUMENTS

| | | | |
|---|---|---|---|
| 5,893,043 A | 4/1999 | Moehlenbrink et al. | |
| 6,029,173 A | 2/2000 | Meek et al. | |
| 6,218,961 B1 | 4/2001 | Gross et al. | |
| 6,434,452 B1 | 8/2002 | Gray | |
| 6,641,090 B2 | 11/2003 | Meyer | |
| 6,728,708 B1 | 4/2004 | Yotka et al. | |
| 6,993,152 B2 | 1/2006 | Patterson et al. | |
| 7,084,882 B1 | 8/2006 | Dorum et al. | |
| 7,142,656 B2 | 11/2006 | Moody et al. | |
| 7,142,982 B2 | 11/2006 | Hickenlooper et al. | |
| 7,564,994 B1 | 7/2009 | Steinberg et al. | |
| 7,667,642 B1 * | 2/2010 | Frericks et al. | 342/357.57 |
| 2002/0072833 A1 | 6/2002 | Gray | |
| 2002/0109049 A1 | 8/2002 | Alacoque et al. | |
| 2003/0033050 A1 * | 2/2003 | Yutkowitz et al. | 700/189 |
| 2003/0204385 A1 * | 10/2003 | Klauder, Jr. | 703/2 |
| 2005/0149255 A1 | 7/2005 | Vogel et al. | |
| 2005/0152505 A1 * | 7/2005 | Sokolov | 378/210 |

(Continued)

FOREIGN PATENT DOCUMENTS

EP 0795454 A1 9/1997

OTHER PUBLICATIONS

Stopford, Ross H "AU Application No. 2010200767 Office Action Dec. 14, 2011", , Publisher: IPA, Published in: AU.

(Continued)

*Primary Examiner* — James Trammell
*Assistant Examiner* — Muhammad Shafi
(74) *Attorney, Agent, or Firm* — Kaplan Breyer Schwarz & Ottesen, LLP (57) ABSTRACT

A database schema is disclosed that can significantly reduce the quantity of data required to describe the geometry of a train track and the geo-locations of features (e.g., grade crossings, mileposts, signals, platforms, switches, spurs, etc.) along the track. In accordance with the illustrative embodiment, a railroad track is represented as a plurality of partitions, each of which has its geometry contained within unique track point elements. Multiple track partitions are then joined together by common track point elements at their boundaries to create continuous rail networks. A compact table schema is employed that enables continuous sections of three-dimensional track splines to be rendered accurately in the track database, irrespective of the location of vertical and horizontal curvature along track segments. The data representation scheme also enables efficient storage of the geo-locations of features along a track, as well as the direct reconstitution of accurate three-dimensional track splines.

9 Claims, 8 Drawing Sheets

U.S. PATENT DOCUMENTS

| | | |
|---|---|---|
| 2005/0228620 A1 | 10/2005 | Convert et al. |
| 2006/0271291 A1 | 11/2006 | Meyer |
| 2010/0099455 A1 | 4/2010 | Bonanni |
| 2010/0168942 A1 | 7/2010 | Noffsinger et al. |

OTHER PUBLICATIONS

Kumar, Abhimanyu, "AU Application No. 2010200765 Office Action Dec. 21, 2011", , Publisher: IPA, Published in: AU.

Badii, Behrang, "U.S. Appl. No. 12/402,681 Office Action Jun. 28, 2011", , Publisher: USPTO, Published in: US.

Stopford, Ross H "AU Application No. 2010200767 Office Action Oct. 15, 2010", , Publisher: IPA, Published in: AU.

Fleurantin, Jean B "U.S. Appl. No. 12/402,695 Office Action May 25, 2011", , Publisher: USPTO, Published in: US.

Stopford, Ross, "AU Application No. 2010200767 Office Action Oct. 6, 2011", , Publisher: IPA, Published in: AU.

Weston et al., "Condition Monitoring of Railway Track Using In-Service Trains", Nov. 29-30, 2006, pp. 26-31, Publisher: IEEE.

Fleurantin, Jean B., "U.S. Appl. No. 12/402,695 Notice of Allowance Oct. 27, 2011", , Publisher: USPTO, Published in: US.

Kumar, Abhimanyu, "AU Application No. 2010200766 Office Action Feb. 21, 2011", , Publisher: IPA, Published in: AU.

Badii, Behrang, "U.S. Appl. No. 12/402,681 Office Action Oct. 28, 2011", , Publisher: USPTO, Published in: US.

Badii, Behrang, "U.S. Appl. No. 12/402,681 Office Action Feb. 2, 2012", , Publisher: USPTO, Published in: US.

Stopford, R.H., "AU Application No. 2010200767 Office Action Feb. 10, 2012", , Publisher: IPA, Published in: AU.

McDieunel, Marc, "U.S. Appl. No. 12/402,681 Supplemental Notice of Allowability", Jul. 9, 2012, Publisher: USPTO, Published in: US.

McDieunel, Marc, "U.S. Appl. No. 12/402,681 Notice of Allowance May 10, 2012", , Publisher: USPTO, Published in: US.

\* cited by examiner

| TABLE 401 | | | | | | |
|---|---|---|---|---|---|---|
| X (501) | Y (502) | Z (503) | HEADING (504) | GRADE (505) | CURVATURE (506) | OFFSET (507) |
| | | | | | | |
| | | | | | | |
| | | | | | | |

| FEATURE ID 601-*i* | TRACK POINT 602-*i* | OFFSET 603-*i* |
|---|---|---|
| | | |
| | | |

TABLE 402-*i*

DATABASE FOR EFFICIENT STORAGE OF TRACK GEOMETRY AND FEATURE LOCATIONS

CROSS-REFERENCE TO RELATED APPLICATIONS

This application is related to U.S. patent application Ser. No. 12/402,681 entitled "Validation of Track Databases" and U.S. patent application Ser. No. 12/402,695 entitled "Updating Track Databases After Track Maintenance", both of which were filed on the same day as the present application.

FIELD OF THE INVENTION

The present invention relates to databases in general, and, more particularly, to a database for efficiently storing railroad track geometry and feature location information.

BACKGROUND OF THE INVENTION

In many instances it would be desirable to have a database that captures the geometry of a train track, as well as the geo-locations of various features (e.g., grade crossings, mileposts, signals, platforms, switches, spurs, etc.) along the train track. For example, such a database would be useful in train motion and path-taken navigation algorithms, predictive braking algorithms, and locomotive fuel management algorithms.

If a track database become very large, however, a variety of issues can mitigate the database's utility. For example, a large database typically requires greater effort to build and maintain, is more susceptible to data errors, and has less portability. Moreover, high data-rate links might be required to transmit data to locomotives if the track database is too large.

SUMMARY OF THE INVENTION

The present invention provides a data representation scheme that can significantly reduce the quantity of data required to describe track geometry and feature geo-locations. In accordance with the illustrative embodiment, a compact table schema is employed that enables continuous sections of three-dimensional track splines to be rendered accurately in the track database, irrespective of the location of vertical and horizontal curvature along track segments. The data representation scheme also enables efficient storage of the geo-locations of features along a track, as well as the direct reconstitution of accurate three-dimensional track splines.

In addition to compressing the size of the track database while maintaining high accuracy, the illustrative embodiment also enables:

- computation of track feature three-dimensional coordinates in terms of simple trackline offsets,
- derivation of track feature geographic coordinates from simple track offset parameters and track geometry coefficients, and
- reconstitution of the original track centerline database from track point parameters.

The illustrative embodiment comprises: obtaining a set of geo-locations from a survey of a train track; converting the geo-locations from latitude/longitude/altitude to points expressed in three-dimensional Earth-Centered Earth-Fixed Cartesian coordinates; generating, based on the three-dimensional coordinates of the set of points, a piecewise polynomial spline that is defined in terms of a proper subset of the set of points; populating a first data structure that stores for each point P in the subset: (i) the three-dimensional Earth-Centered Earth-Fixed Cartesian coordinates of the point P, (ii) an estimate of the heading of the train track at the point P, (iii) an estimate of the grade of the train track at the point P, and (iv) an estimate of the curvature of the train track at the point P; and populating a second data structure that stores for each of a non-empty set of features along the train track: (i) an indicium of a point in the subset, and (ii) an offset.

DETAILED DESCRIPTION

Figure 1:
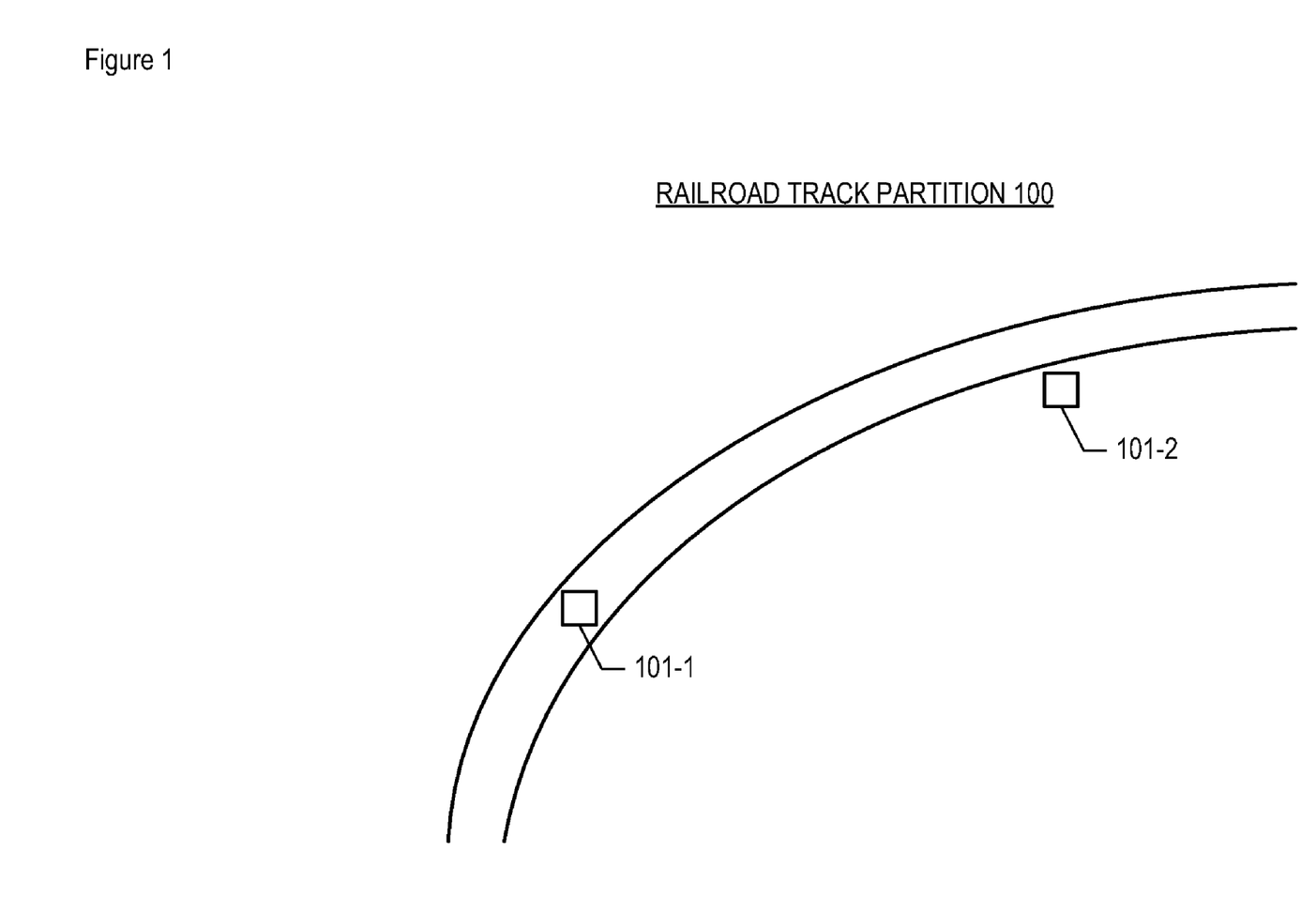
FIG. 1 depicts a segment of illustrative railroad track partition 100 and illustrative features 101-1 and 101-2, in accordance with the illustrative embodiment of the present invention.

FIG. 1 depicts a segment of illustrative railroad track partition 100 and illustrative features 101-1 and 101-2, in accordance with the illustrative embodiment of the present invention. As shown in FIG. 1, a feature might be located either on or abreast railroad track partition 100, depending on the particular type of feature. For example, feature 101-1, which is located on railroad track partition 100, might be a switch, while feature 101-2, which is abreast railroad track partition 100, might be a platform.

Figure 2:
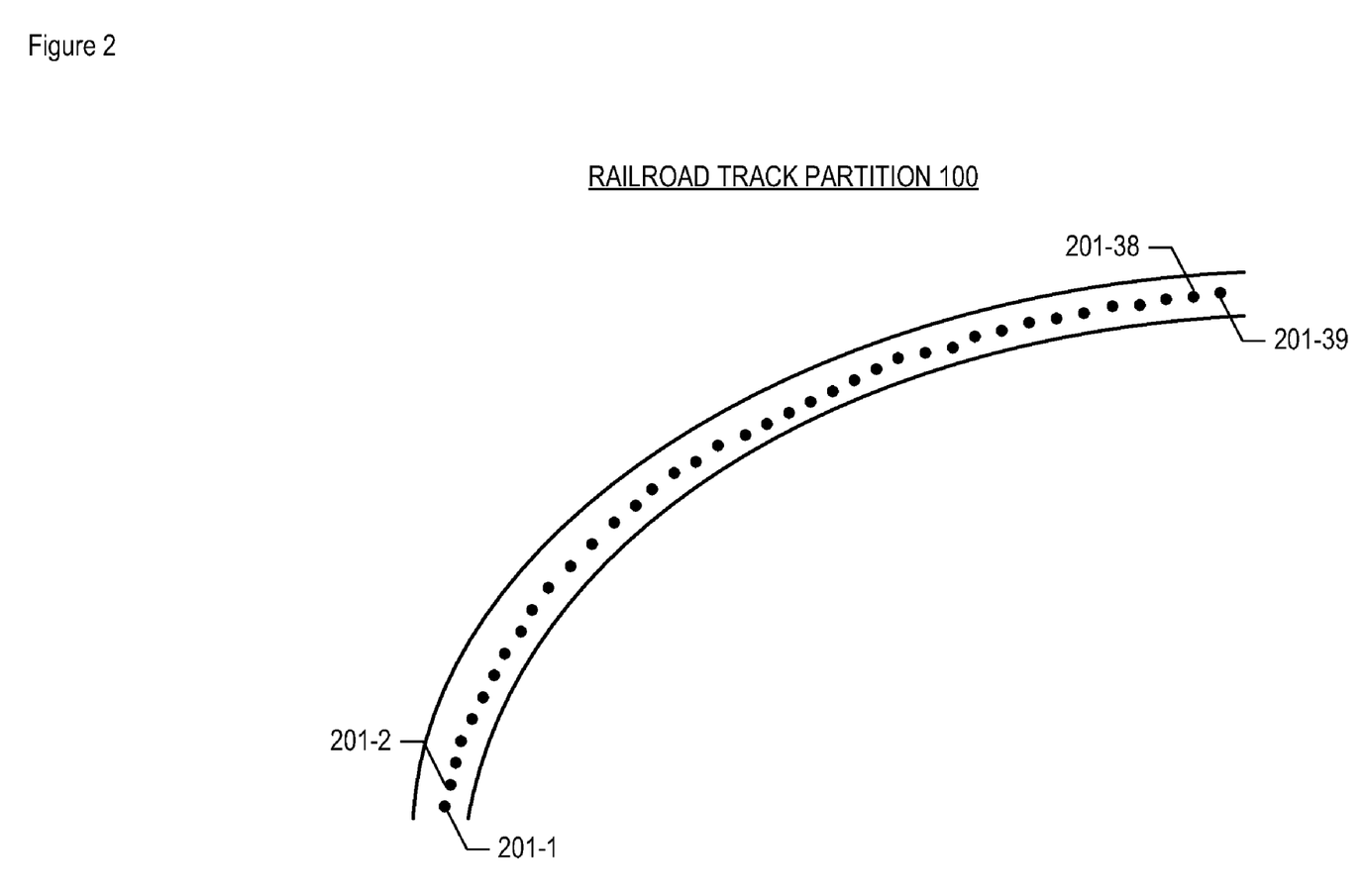
FIG. 2 depicts railroad track partition 100 and illustrative centerline geo-locations 201-1 through 201-39 that are obtained from a survey, in accordance with the illustrative embodiment of the present invention.

FIG. 2 depicts railroad track partition 100 and illustrative centerline geo-locations 201-1 through 201-39 that are obtained from a survey, in accordance with the illustrative embodiment of the present invention. As will be appreciated by those skilled in the art, the fact that there happen to be 39 centerline geo-locations depicted in FIG. 2 is merely illustrative, and does not represent the actual number or spacing of centerline geo-locations obtained in a track survey.

In accordance with the illustrative embodiment, centerline geo-locations 201-1 through 201-39 are expressed in latitude/longitude/altitude, and might be obtained from readings of a Global Positioning System (GPS) unit traveling along railroad track partition 100, from an aerial survey, etc. As indicated above, a key objective of the present invention is the construction of a database of relatively small size that accurately captures the track geometry, as opposed to a database that stores all of the track centerline geo-locations, which would require a significantly larger amount of memory.

Figure 3:
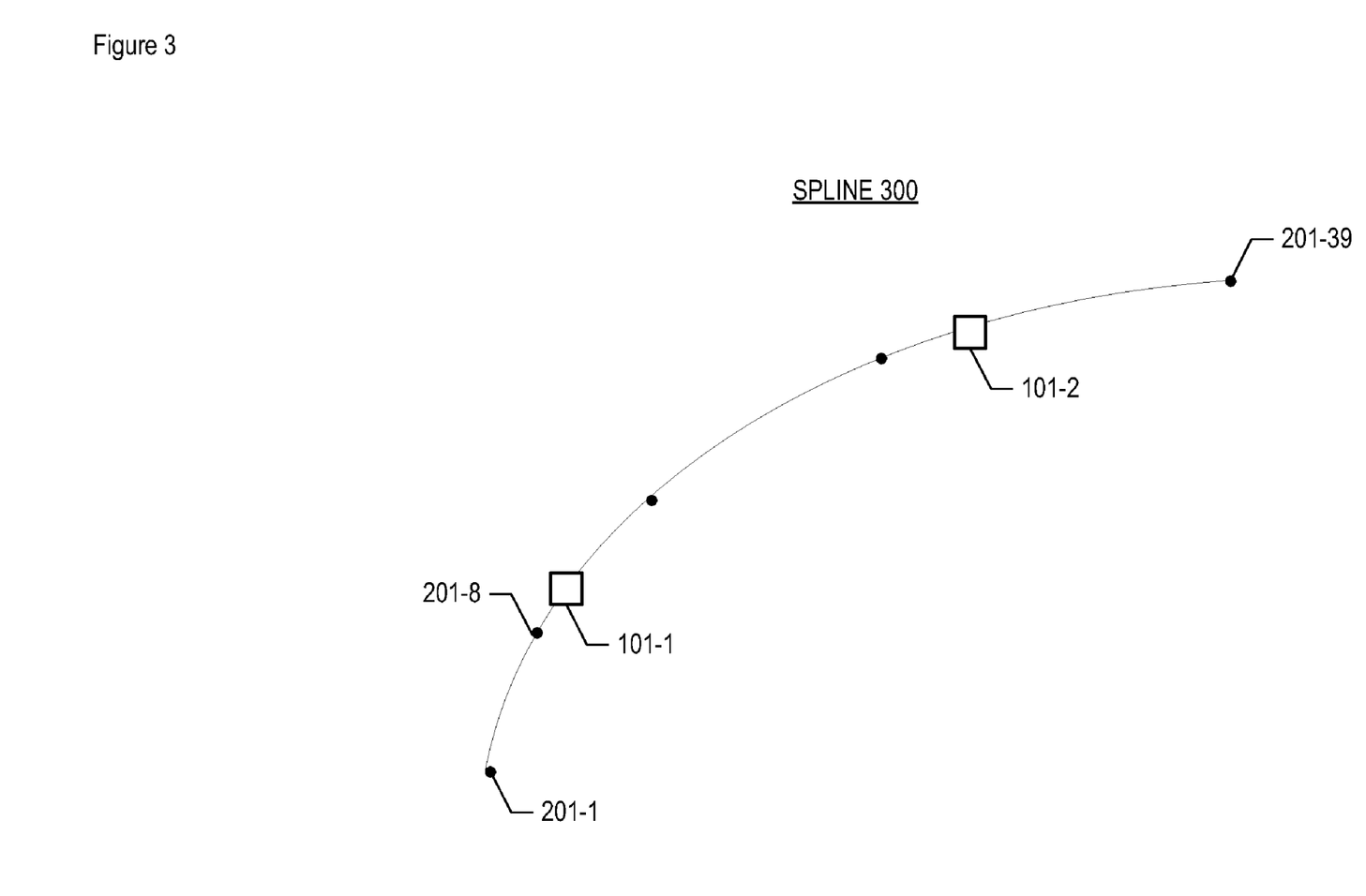
FIG. 3 depicts illustrative piecewise polynomial spline 300 that is fit to a subset of centerline geo-locations 201-1 through 201-39, in accordance with the illustrative embodiment of the present invention.

FIG. 3 depicts illustrative piecewise polynomial spline 300 that is fit to a subset of centerline geo-locations 201-1 through 201-39, in accordance with the illustrative embodiment of the present invention. As shown in FIG. 3, each point of piecewise polynomial spline 300 corresponds to a particular centerline geo-location in this subset (e.g., centerline geo-location 201-1, centerline geo-location 201-39, etc.). The manner in which piecewise polynomial spline 300 is represented and constructed is described in detail below and with respect to FIGS. 7 and 8.

Figure 4:
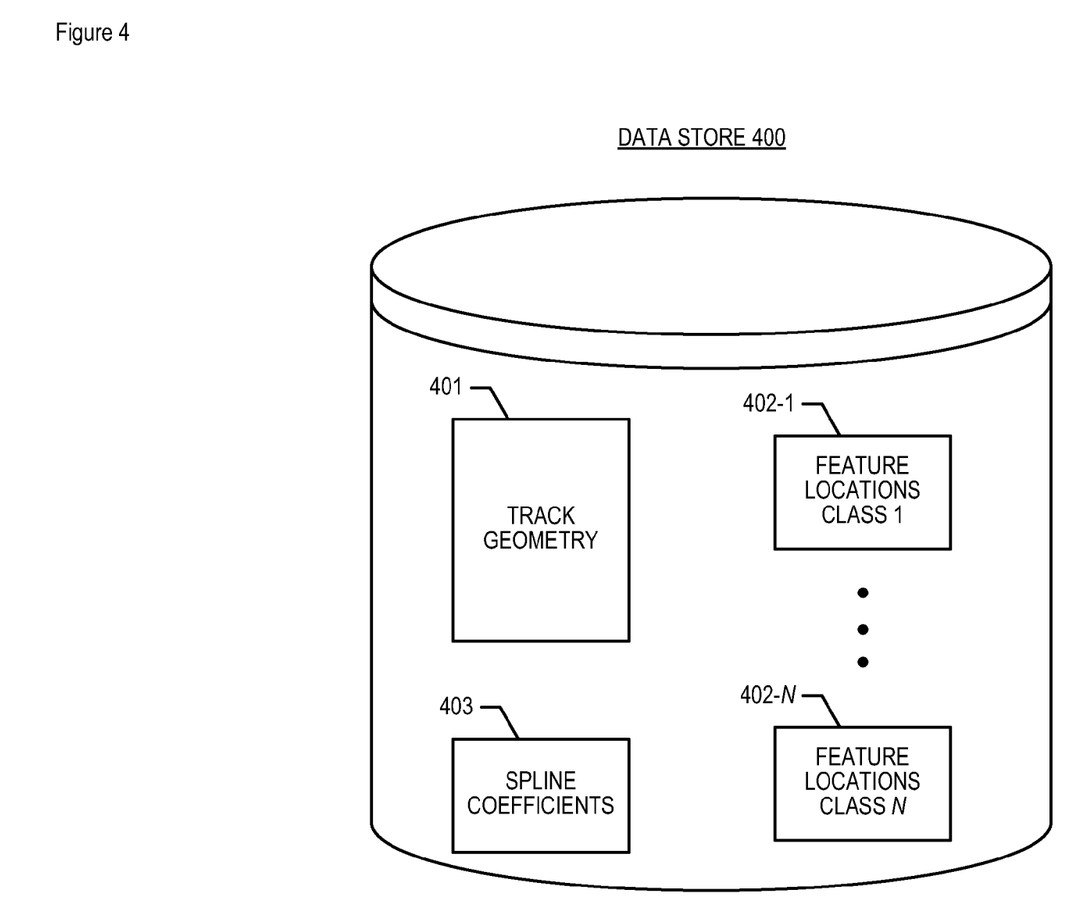
FIG. 4 depicts data store 400 for storing track geometry data and feature locations, in accordance with the illustrative embodiment of the present invention.

FIG. 4 depicts data store 400 for storing track geometry data and feature locations, in accordance with the illustrative embodiment of the present invention. In accordance with the illustrative embodiment, data store 400 is a relational database; as will be appreciated by those skilled in the art, however, some other embodiments of the present invention might employ another kind of data store (e.g., an alternative type of database such as an object-oriented database or a hierarchical database, one or more unstructured "flat" files, etc.), and it will be clear to those skilled in the art, after reading this disclosure, how to make and use such alternative embodiments of data store 400.

As shown in FIG. 4, data store comprises table 401 and tables 402-1 through 402-N, where N is a positive integer. Table 401 is a data structure for storing track geometry information, and in particular, data derived from piecewise polynomial spline 300, as described in detail below and with respect to FIG. 5. Tables 402-1 through 402-N are data structures for storing the locations of features along railroad track partition 100, as described in detail below and with respect to FIG. 6.

Figure 6:
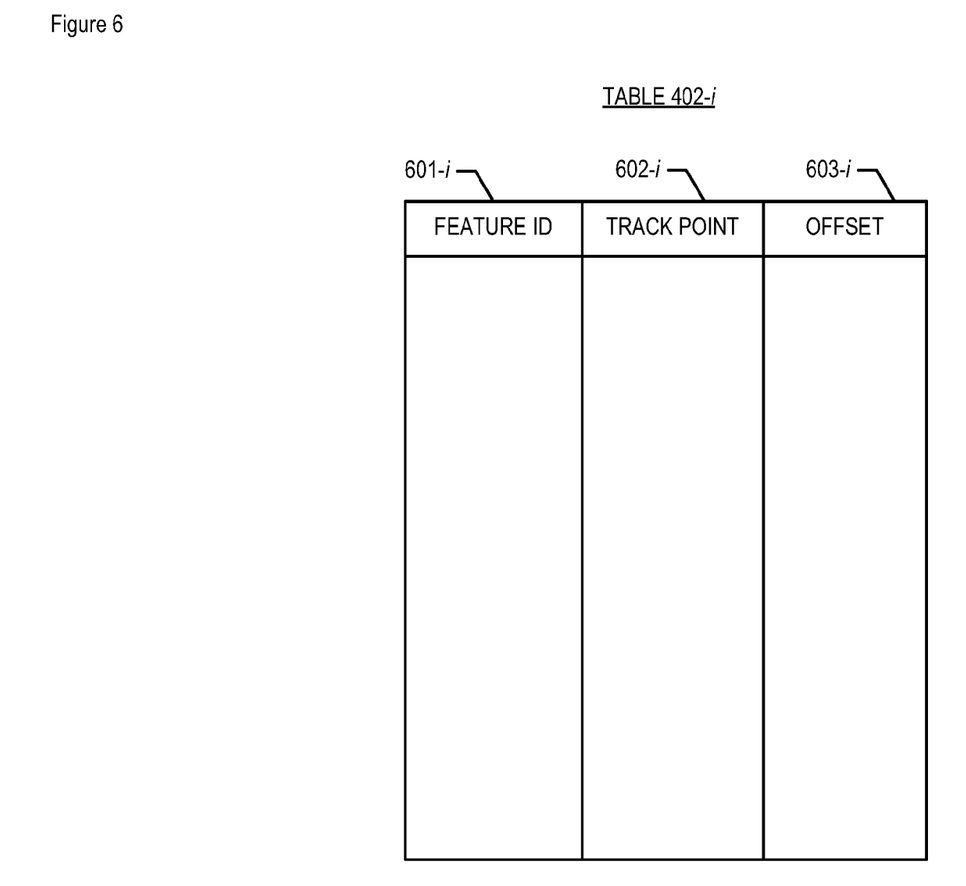
FIG. 6 depicts the structure of table 402-i, where i is an integer between 1 and N, in accordance with the illustrative embodiment of the present invention.

In accordance with the illustrative embodiment, each table 402-i, where i is an integer between 1 and N inclusive, corresponds to a respective feature class (e.g., mileposts, traffic signals, platforms, etc.), so that, for example, table 402-1 might store the locations of all mileposts along railroad track partition 100, table 402-2 might store the locations of all traffic signals along railroad track partition 100, and so forth. Moreover, in accordance with the illustrative embodiment tables 402-1 through 402-N are organized into physical track locations.

As will be appreciated by those skilled in the art, some other embodiments of the present invention might organize the data stored in data store 400 in an alternative manner (e.g., the locations of all types of features might be stored in a single table, etc.), and it will be clear to those skilled in the art, after reading this disclosure, how to make and use such alternative embodiments. Moreover, it will be appreciated by those skilled in the art that in some other embodiments data store 400 might employ alternative types of data structures in lieu of tables (e.g., objects in an object-oriented database, trees in a hierarchical database, etc.), and it will be clear to those skilled in the art, after reading this disclosure, how to make and use such embodiments.

Figure 5:
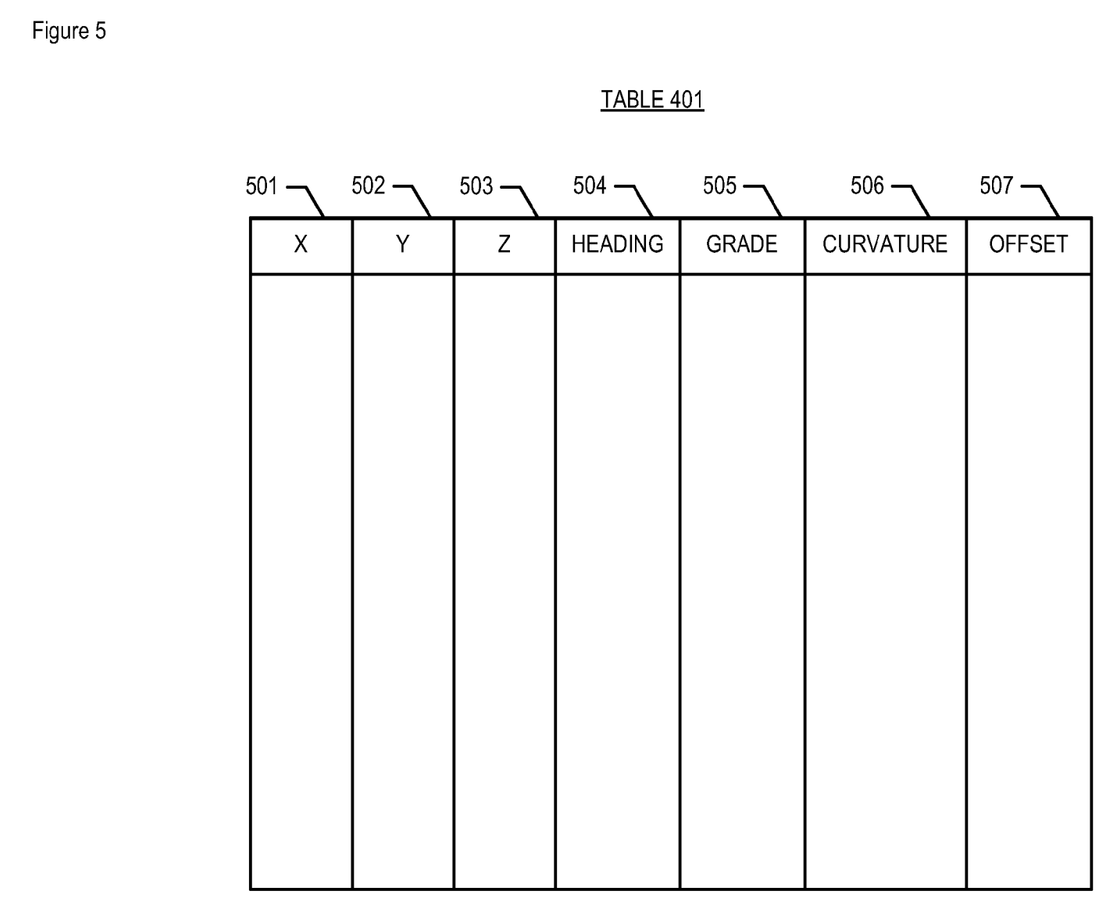
FIG. 5 depicts the structure of table 401, as shown in FIG. 4, in accordance with the illustrative embodiment of the present invention.

FIG. 5 depicts the structure of table 401 in accordance with the illustrative embodiment of the present invention. Each row in table 401 corresponds to a particular point of piecewise polynomial spline 300, which in turn corresponds to centerline geo-location 201-i that is included in (e.g., 201-1, 201-39, etc.). As shown in FIG. 5, table 401 comprises columns 501 through 507.

Columns 501, 502, and 503 store x, y, and z coordinates, respectively, for each point of piecewise polynomial spline 300. As described below and with respect to FIG. 7, these coordinates are Earth-Centered Earth-Fixed Cartesian coordinates and are derived from the latitude, longitude, and altitude of the corresponding centerline geo-locations.

Columns 504, 505, and 506 store estimates of the heading, grade, and curvature of railroad track partition 100, respectively, at each point of piecewise polynomial spline 300. In accordance with the illustrative embodiment, column 504 stores the heading in degrees, column 505 stores the grade as a percentage, and column 506 represents track curvature in units of degrees/meter.

For the feature offsets, there is no corresponding track point element specifically located at that feature. The feature can lie between two track point elements. For feature offsets, however, one needs to have the corresponding track partition's track point elements (shown in FIG. 5) which do describe the geometry of that section of track.

FIG. 6 depicts the structure of table 402-i, where i is an integer between 1 and N, in accordance with the illustrative embodiment of the present invention. Each row in table 402-i corresponds to a feature of class i (e.g., mileposts, traffic signals, etc.) along railroad track partition 100. As shown in FIG. 6, table 402-i comprises columns 601-i, 602-i, and 603-i. Column 601-i stores an identifier that uniquely identifies each feature; column 602-i stores an indicium of a particular point of piecewise polynomial spline 300 (e.g., its row number in table 401, etc.), and 603-i stores an estimated distance offset from the point specified by column 602-i. In this way, the exact location of each feature can be derived from piecewise polynomial spline 300 and the corresponding entries of columns 602-i and 603-i.

For example, a row in table 402-i for feature 101-1 would specify an indicium of the point corresponding to centerline geo-location 201-8 (which is the point of spline 300 that immediately precedes feature 101-1, as shown in FIG. 3), and an estimated distance offset along railroad track partition 100 from this point (say, 205.3 centimeters). As will be appreciated by those skilled in the art, column 602-i is not required to determine the three-dimensional coordinates of a track-centric feature at a specific offset into the partition. The computations required to recover the geo-location of a feature from the information stored in tables 401 and 402-i are described in detail below and with respect to FIG. 8.

Figure 7:
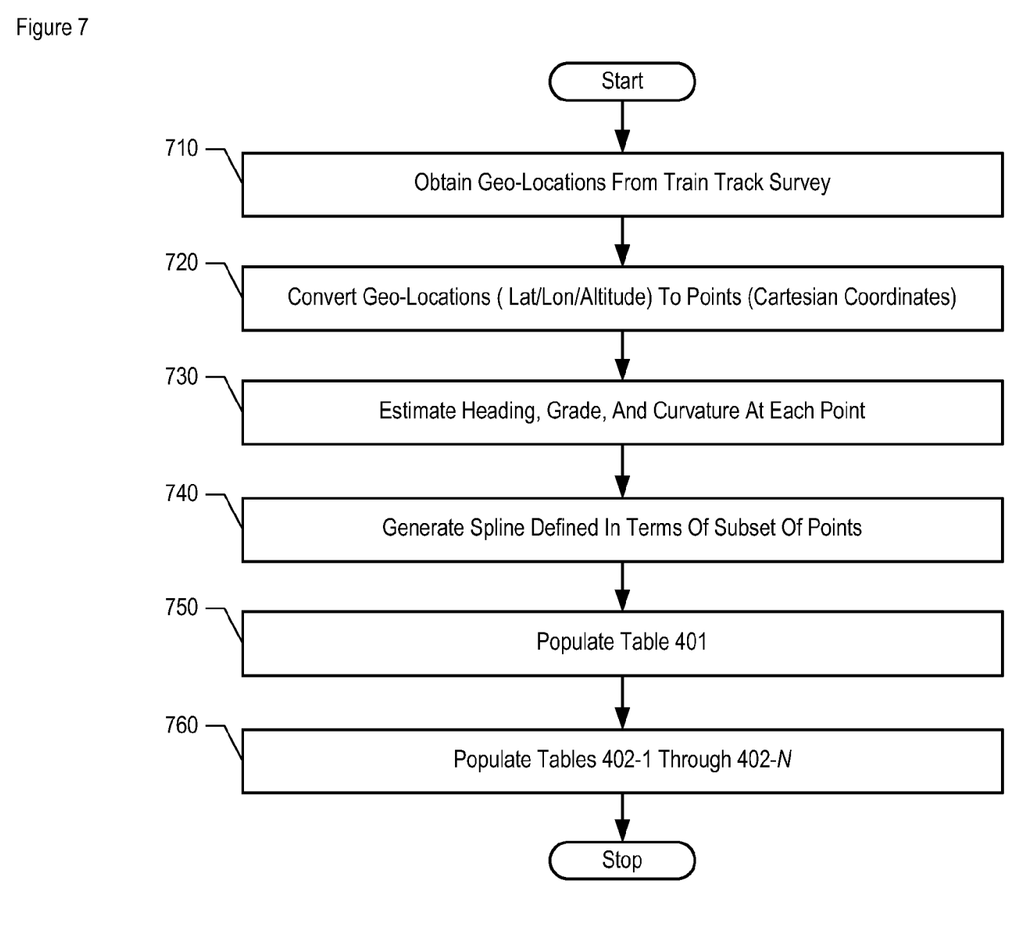
FIG. 7 depicts a flowchart of a method for populating tables 401 and 402-1 through 402-N, in accordance with the illustrative embodiment of the present invention.

FIG. 7 depicts a flowchart of a method for populating tables 401 and 402-1 through 402-N, in accordance with the illustrative embodiment of the present invention. It will be clear to those skilled in the art, after reading this disclosure, which tasks depicted in FIG. 7 can be performed simultaneously or in a different order than that depicted.

At task 710, track centerline geo-locations 201 and feature geo-locations 101 are obtained from a survey of railroad track partition 100.

At task 720, geo-locations 201 are converted from latitude/longitude/altitude to points expressed in Earth-Centered Earth-Fixed Cartesian coordinates, in well-known fashion.

At task 730, the heading, grade, and curvature of railroad track partition 100 are estimated at each of the points determined at task 720, in well-known fashion.

At task 740, piecewise polynomial spline 300 is generated, where the spline is defined in terms of a proper subset of the points determined at task 720.

At task 750, columns 501 through 506 of table 401 are populated with the coordinates and heading/grade/curvature estimates for each of the subset of points determined at task 740. In addition, column 507 is populated with a distance offset from the first point in the table (i.e., the point corresponding to geo-location 201-1), so that the entries in column 507 are monotonically increasing, starting with zero in the first row. The distance offset is particularly useful in determining the locations, extents, magnitude, and nature of horizontal and vertical railroad track curves.

At task 760, tables 402-1 through 402-N are populated with data corresponding to features 101 of railroad track partition 100, where, as described above, each feature corresponds to a row in one of these tables, and the corresponding row comprises: a feature identifier, an indicium of the point on piecewise polynomial spline 300 that immediately precedes the feature, and an estimated distance offset from this point. As will be appreciated by those skilled in the art, the distance offset can be estimated via elementary Calculus from the coordinates of the feature, the coordinates of the preceding point, and the equation of piecewise polynomial spline 300. As mentioned above, the geo-locations of features 101 can be recovered from these data via the method described below and with respect to FIG. 8.

Figure 8:
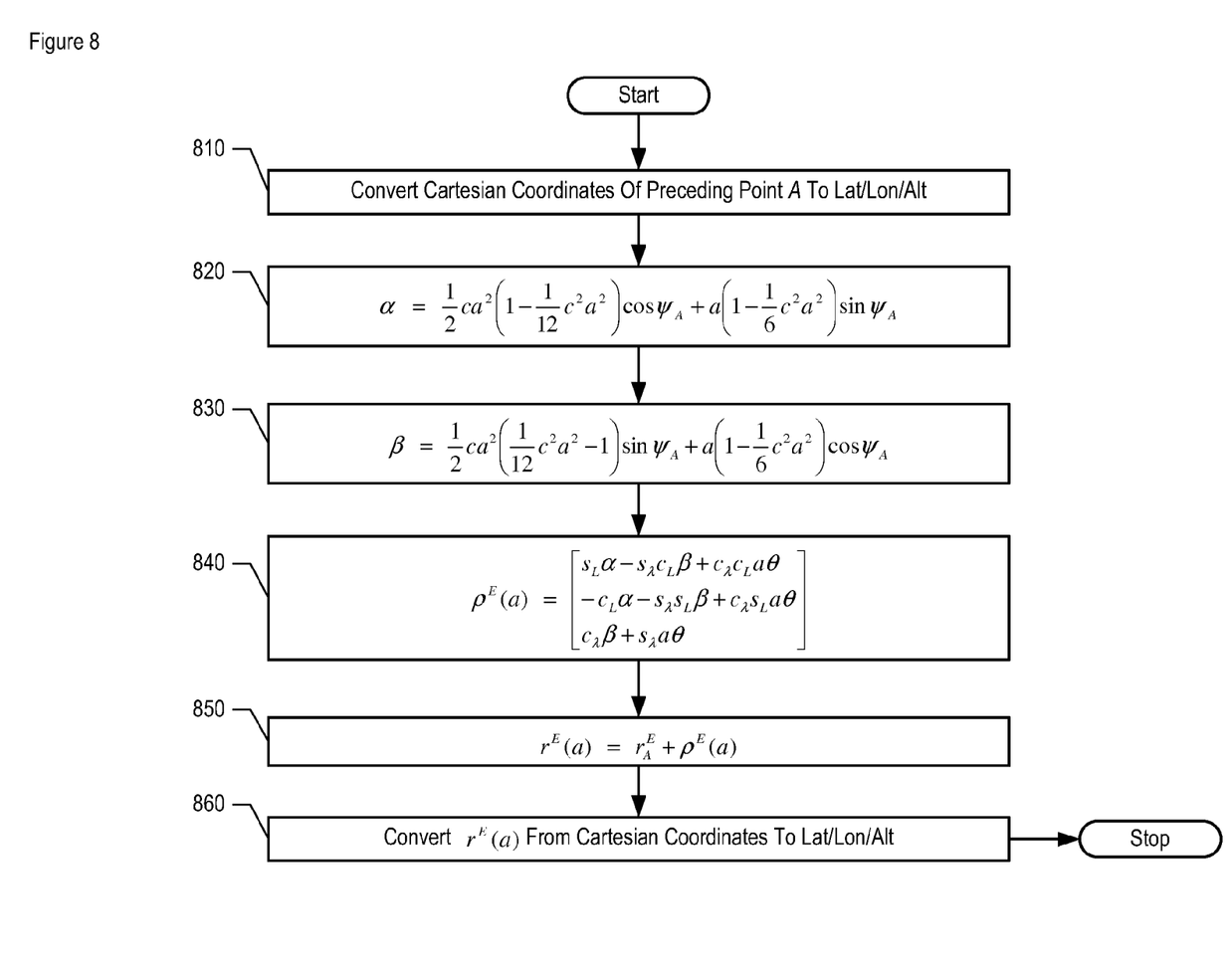
FIG. 8 depicts a flowchart of a method for determining the geo-location of a feature based on the contents of data store 400, in accordance with the illustrative embodiment of the present invention.

FIG. 8 depicts a flowchart of a method for determining the geo-location of a feature based on the contents of data store 400, in accordance with the illustrative embodiment of the present invention. It will be clear to those skilled in the art, after reading this disclosure, which tasks depicted in FIG. 8 can be performed simultaneously or in a different order than that depicted.

At task 810, the Cartesian coordinates of preceding point A on piecewise polynomial spline 300 (i.e., A is the point on spline 300 that immediately precedes the feature) is converted to latitude/longitude/altitude, in well-known fashion.

At task 820, coefficient α is computed using Equation 1:

$$\alpha = \frac{1}{2}ca^2\left(1 - \frac{1}{12}c^2a^2\right)\cos\psi_A + a\left(1 - \frac{1}{6}c^2a^2\right)\sin\psi_A \quad \text{(Eq. 1)}$$

where a is an offset from point A, c is curvature, and $\psi_A$ is the heading at point A.

At task 830, coefficient β is computed using Equation 2:

$$\beta = \frac{1}{2}ca^2\left(\frac{1}{12}c^2a^2 - 1\right)\sin\psi_A + a\left(1 - \frac{1}{6}c^2a^2\right)\cos\psi_A \quad \text{(Eq. 2)}$$

At task 840, vector $\underline{\rho}^E(\alpha)$ is computed using Equation 3:

$$\underline{\rho}^E(a) = \begin{bmatrix} s_L\alpha - s_\lambda c_L\beta + c_\lambda c_L a\theta \\ -c_L\alpha - s_\lambda s_L\beta + c_\lambda s_L a\theta \\ c_\lambda\beta + s_\lambda a\theta \end{bmatrix} \quad \text{(Eq. 3)}$$

where θ is grade, $s_L$ is shorthand for sine(longitude), $s_\lambda$ is shorthand for sine(latitude), $c_L$ is shorthand for cosine(longitude), $c_\lambda$ is shorthand for cosine(latitude), and latitude is geodetic. Vector $\underline{\rho}^E(\alpha)$ is the Earth-Centered Earth-Fixed displacement vector to get to the centerline point at distance a beyond point A.

At task 850, Cartesian coordinate vector $\underline{r}^E(\alpha)$ is computed using Equation 4:

$$\underline{r}^E(\alpha) = \underline{r}_A^E + \underline{\rho}^E(\alpha) \quad \text{(Eq. 4)}$$

where $\underline{r}_A^E$ is the vector of Earth-Centered Earth-Fixed coordinates stored at point A.

At task 860, vector $\underline{r}^E(\alpha)$ is converted from Cartesian coordinates to latitude/longitude/altitude, in well-known fashion. After task 860, the method of FIG. 8 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for operating a train on a train track according to a smaller-size database that captures the geometry of the train track, the method comprising:
    obtaining a set of geo-locations from a survey of the train track, wherein each geo-location is a point on the centerline of the train track, and wherein a first database comprises the obtained set of centerline geo-locations;
    converting the centerline geo-locations from latitude/longitude/altitude to a set of points expressed in three-dimensional Earth-Centered Earth-Fixed Cartesian coordinates;
    generating, by a data-processing system, based on the three-dimensional coordinates of the set of points, a piecewise polynomial spline that is defined in terms of a proper subset of the set of points;
    populating, by the data-processing system, a first data structure in a second database, wherein the first data structure stores for each point P in the subset of the piecewise polynomial spline:
      (i) the three-dimensional Earth-Centered Earth-Fixed Cartesian coordinates of the point P,
      (ii) an estimate of the heading of the train track at the point P,
      (iii) an estimate of the grade of the train track at the point P, and
      (iv) an estimate of the curvature of the train track at the point P;
    populating, by the data-processing system, a second data structure in the second database, wherein the second data structure stores for each of a non-empty set of features along the train track:
      (i) an indicium of a point in the subset of the piecewise polynomial spline, and
      (ii) an offset from the point to the feature;
    wherein the second database comprises a smaller quantity of data than the first database; and
    operating the train on the train track according to the second database.

2. The method of claim 1 further comprising conditioning the set of centerline geo-locations to ensure the absence of direction reversals and discontinuities.

3. The method of claim 1 wherein the first data structure identifies one of the points in the subset as the first point, and wherein the data-processing system further populates the first data structure for each point P in the subset with an offset from the first point.

4. The method of claim 1 wherein the first data structure and the second data structure are lists stored in respective files in the second database.

5. The method of claim 1 wherein at least one of the features is a station.

6. The method of claim 1 wherein at least one of the features is a grade crossing.

7. The method of claim 1 wherein a data store comprises the first data structure and the second data structure.

8. The method of claim 1 wherein the second data structure represents the locations of the non-empty set of features along the train track.

9. The method of claim 1 further comprising:
    deriving, by the data-processing system, the exact location of a feature in the non-empty set of features from the piecewise polynomial spline and corresponding entries in the second data structure.

* * * * *